United States Patent [19]
Tsuji et al.

[11] Patent Number: 6,048,644
[45] Date of Patent: Apr. 11, 2000

[54] HYDROGEN STORAGE ALLOY ELECTRODE

[75] Inventors: Yoichiro Tsuji, Katano; Osamu Yamamoto, Hirakata; Yoshinori Toyoguchi, Yao, all of Japan

[73] Assignee: Matsushita Electric Industrial Co., Ltd., Osaka-fu, Japan

[21] Appl. No.: 09/038,921

[22] Filed: Mar. 12, 1998

[30] Foreign Application Priority Data

Mar. 24, 1997 [JP] Japan ..................... 9-069515
Sep. 5, 1997 [JP] Japan ..................... 9-240664

[51] Int. Cl.$^7$ .................................. H01M 4/38
[52] U.S. Cl. ..................... 429/218.2; 420/900
[58] Field of Search ............... 429/218.2, 223; 420/900

[56] References Cited

U.S. PATENT DOCUMENTS

| | | |
|---|---|---|
| 4,200,460 | 4/1980 | Grossman et al. . |
| 4,661,415 | 4/1987 | Ebato et al. ............... 428/570 |
| 4,925,748 | 5/1990 | Ikoma et al. . |
| 5,330,861 | 7/1994 | Fetcenko et al. . |
| 5,451,474 | 9/1995 | Wu et al. ..................... 429/59 |
| 5,480,741 | 1/1996 | Sakai et al. ................. 429/59 |
| 5,512,385 | 4/1996 | Komori . |
| 5,738,736 | 4/1998 | Tsuji et al. ................. 148/421 |

FOREIGN PATENT DOCUMENTS

| | | |
|---|---|---|
| 0 591 606 A1 | 4/1994 | European Pat. Off. . |
| 0 696 823 A1 | 2/1996 | European Pat. Off. . |
| 0 720 965 A1 | 7/1996 | European Pat. Off. . |
| 05109406 | 4/1993 | Japan . |
| 09063569 | 3/1997 | Japan . |
| 09087781 | 3/1997 | Japan . |
| 9-063569 | 3/1997 | Japan ............... H01M 4/24 |
| 09231965 | 9/1997 | Japan . |
| 9-231965 | 9/1997 | Japan ............... H01M 4/24 |
| 09316571 | 12/1997 | Japan . |

*Primary Examiner*—Maria Nuzzolillo
*Assistant Examiner*—J. O'Malley
*Attorney, Agent, or Firm*—Akin, Gump, Strauss, Hauer & Feld, L.L.P.

[57] ABSTRACT

The present invention provides a hydrogen storage alloy electrode high in capacity and exceptional in cycle life characteristic by improving a conventional V-based hydrogen storage alloy of a body-centered cubic structure. The electrode comprises particles of a hydrogen storage alloy represented by the general formula $V_{1-a-b-c-d}Ti_aCr_bM_cL_d$, wherein M is at least one element selected from the group consisting of Mn, Fe, Co, Cu, Nb, Zn, Zr, Mo, Ag, Hf, Ta, W, Al, Si, C, N, P and B, and L is at least one element selected from the group consisting of Y and rare earth elements, and $0.2 \leq a \leq 0.5$, $0.1 \leq b \leq 0.4$, $0 \leq c \leq 0.2$ and $0 < d \leq 0.03$, the alloy having a body-centered cubic structure. The alloy particles preferably have their surface disposed with an Ni-diffused layer.

18 Claims, 2 Drawing Sheets

HYDROGEN STORAGE ALLOY ELECTRODE

BACKGROUND OF THE INVENTION

The present invention relates to an electrode for alkaline storage batteries that uses a hydrogen storage alloy capable of electrochemically absorbing and desorbing hydrogen in a reversible manner as an active material.

Electrodes using a hydrogen storage alloy which can reversibly absorb and desorb hydrogen as the active material are large in theoretical capacity density compared to a cadmium electrode, and are free from deformation and dendrite formation unlike a zinc electrode. Such electrodes are promising as a negative electrode for alkaline storage batteries that affords a long life and ensures a high energy density, while keeping off pollution.

Common methods for producing those alloys for use in such hydrogen storage alloy electrodes include an arc melting method and an induction melting method.

Currently used hydrogen storage alloys for electrodes include La— or Mm—Ni system multi-element alloys of $AB_5$ type, where Mm represents a misch metal, i.e., a mixture of rare earth elements; A represents an element, such as La, Zr, Ti or the like, which is high in affinity for hydrogen, and B represents an element such as transition elements, for example, Ni, Mn, Cr and the like, which is low in affinity for hydrogen. When those multi-element alloys are used in a battery, they exhibit a capacity close to their theoretical value, and thus it is impossible to expect a further drastically increased capacity for these alloys. This is why there exists a demand for an innovated hydrogen storage alloy material which affords a larger discharge capacity than the conventional alloys of $AB_5$ type.

Alloys that are larger in capacity to absorb hydrogen than those of $AB_5$ type include Ti—V system hydrogen storage alloys. There are proposals to use alloys of this system, for example, those represented by the general formula $Ti_xV_yNi_z$ for the hydrogen storage alloy electrode (Japanese Laid-Open Patent Publications Hei 6-228699, Hei 7-268513, Hei 7-268514, etc.).

Although electrodes prepared from the Ti—V—Ni system hydrogen storage alloys have a larger discharge capacity than the La— or Mm—Ni system multi-element alloys, they have some problem in their cycle life characteristic.

BRIEF SUMMARY OF THE INVENTION

The object of the present invention is to provide a hydrogen storage alloy electrode which is high in capacity and superb in cycle life characteristic by an improvement of a conventional V-based hydrogen storage alloy having a body-centered cubic structure.

The hydrogen storage alloy electrode in accordance with the present invention comprises particles of a hydrogen storage alloy represented by the general formula (1):

(1)

wherein M is at least one element selected from the group consisting of Mn, Fe, Co, Cu, Nb, Zn, Zr, Mo, Ag, Hf, Ta, W, Al, Si, C, N, P and B, and L is at least one element selected from the group consisting of Y and rare earth elements, and wherein $0.2 \leq a \leq 0.5$, $0.1 \leq b \leq 0.4$, $0 \leq c \leq 0.2$ and $0 \leq d \leq 0.03$, the alloy essentially having the body-centered cubic structure.

In a preferred mode of the present invention, the alloy has a mean grain size of 20 μm or less. When the hydrogen storage alloy constituting the electrode in accordance with the present invention has a mean particle size of 40 μm or less, the resultant electrode exhibits an exceptional electrode characteristic.

The use of quench method is effective for manufacturing the alloy. More specifically, the use of an atomizing method, a rotating electrode method, or a quench rolling method facilitates efficient production of the alloy.

By forming an Ni-diffused layer on the surface of each of the hydrogen storage alloy particles, the electrode prepared with this alloy can have a high discharge capacity. The Ni-diffused layer is desirably of the same body-centered cubic structure.

In one method, the Ni-diffused layer is formed by the steps of providing each of the alloy particles with nickel plating or nickel powder coating and subsequently heating those alloy particles at a temperature in a range of 500 to 1000° C. in an inert-gaseous atmosphere or under reduced pressure. Alternately, the Ni-diffused layer may be formed by the steps of mixing alloy particles with nickel powders and subsequently physically diffusing Ni in the alloy particles by the process of mechanical alloying or mechanical grinding.

The present invention provides another hydrogen storage alloy electrode comprising particles of a hydrogen storage alloy represented by the general formula (2):

(2)

wherein Ln is at least one element selected from La and Ce or a mixture of rare earth elements including at least one of La and Ce, M' represents at least one element selected from the group consisting of Cr, Mn, Fe, Co, Nb, Mo, Cu and Zr, and wherein $0.2 \leq x \leq 0.4$ $0.005 \leq z \leq 0.03$ and $0.4 \leq x+y+z \leq 0.7$, the alloy having the body-centered cubic structure.

It is preferable that $0.1 \leq y \leq 0.4$.

In a preferred mode of the present invention, the hydrogen storage alloy is one represented by the general formula (3):

(3)

wherein M" represents at least one element selected from the group consisting of Mn, Fe, Co, Nb, Mo, Cu and Zr, and wherein $0.1 \leq w \leq 0.4$ and w+v=y.

The alloys represented by the general formulae (2) and (3) are preferably dispersed therein a plurality of second phase containing Ln in a concentration of 40 atom %. The second layer is deposited in the mother phase of the alloy when the alloy is cooled after being molten during its production.

It is also preferred that in the alloys represented by the general formulae (2) and (3), the particles have their surface disposed with the Ni-diffused layer, as in the alloy represented by the general formula (1).

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
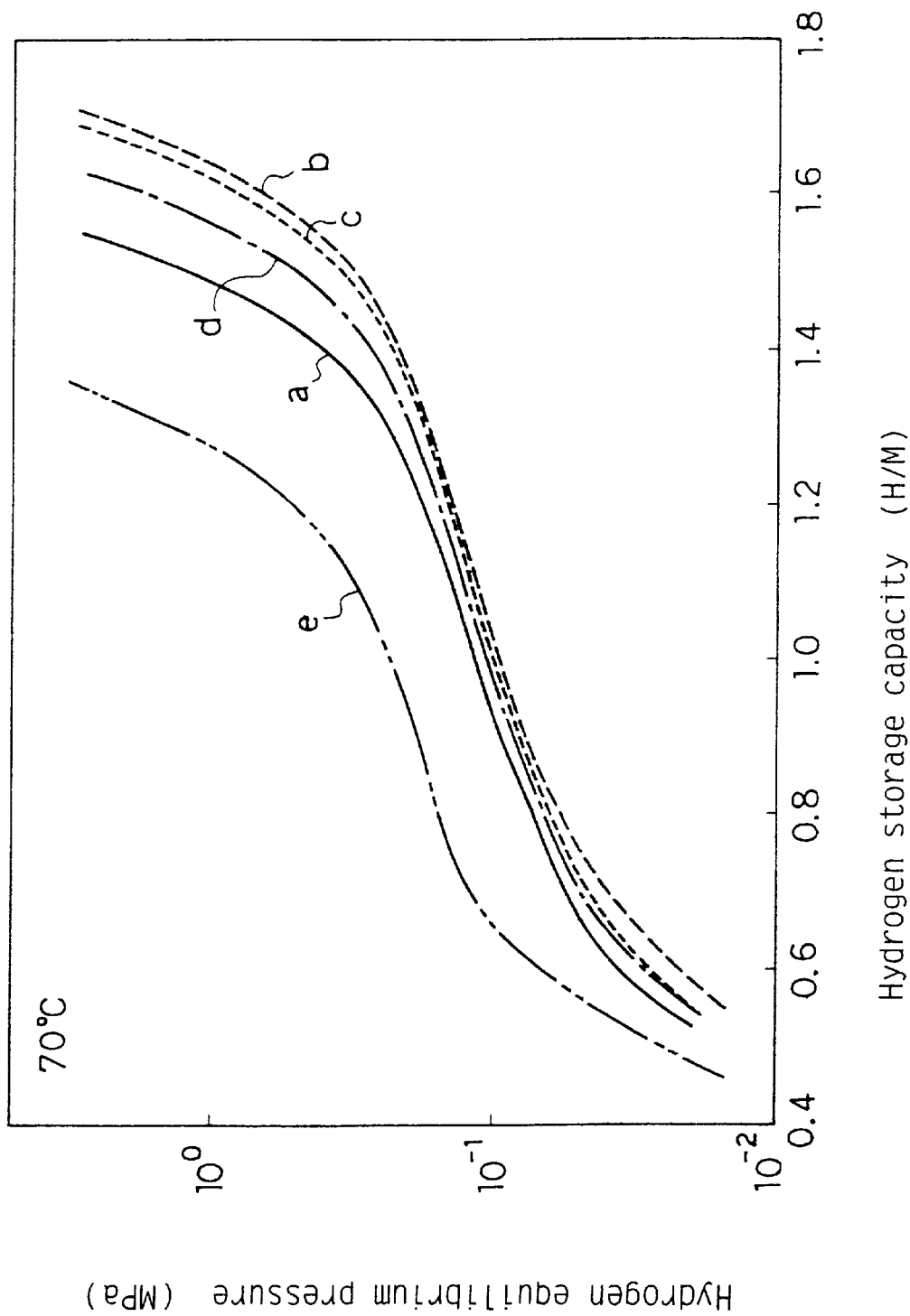
FIG. 1 is a diagram illustrating the characteristics of hydrogen absorption of the hydrogen storage alloy electrodes with varied rare earth elements in accordance with one example of the present invention.

The hydrogen storage alloy used in the present invention is a modification of the conventional V-based solid solution alloy of the body-centered cubic structure. This alloy is increased in hydrogen absorbing capacity by an exclusion from an alloy bulk of nickel which is an essential element for the conventional alloys for use in electrodes.

Metallic vanadium, which is classified as the group having a space lattice of 1 m 3 m, is of the body-centered cubic structure and has a lattice constant of 3.027 angstroms. The hydrogen storage alloy in accordance with the present invention is a solid solution alloy with a randomized substitution of Ti, L or M for the vanadium site. On the other hand, the Ni-diffused layer, which has been formed on the surface of the alloy and has the same body-centered cubic structure as that of the alloy, is liable to form an intermetallic compound TiNi.

In the following, the hydrogen storage alloy in accordance with the present invention will be described more specifically.

(1) Alloy Composition:

To satisfy the hydrogen absorbing capacity and the characteristics as an electrode for batteries required for an alloy used in electrodes, the constituents and their contents were determined as follows:

Ni forms a second phase of the Ti—Ni system in an alloy containing Ni upon being molten, and reduces the hydrogen absorbing capacity of the alloy by the volume equivalent to the volume of the second phase formed. Furthermore, although small in amount, Ni migrates into the main phase of the alloy, causing an elevation of the hydrogen equilibrium pressure of the alloy, which in turn reduces the hydrogen storage capacity of the alloy. Therefore, an elimination of Ni from an alloy bulk produces an increased hydrogen absorbing capacity of the alloy.

Ti has an atomic radius larger than those of V and Cr. Therefore, Ti can increase the lattice size of an alloy containing Ti. As a result, the alloy is decreased in hydrogen equilibrium pressure and increased in hydrogen absorbing capacity. If it is intended to form an Ni-diffused layer on the surface of each of the alloy particles, the presence of Ti facilitates diffusion of Ni at lower temperatures than usual. When the atomic ratio of Ti in the alloy, which will be referred to as "a" hereinafter, is 0.2 or more, a marked effect can be obtained on the increase of hydrogen absorbing capacity of the alloy. However, when 0.5<a, there occurs a reduction in hydrogen equilibrium pressure of the alloy containing Ti and the hydrogen in the alloy is stabilized to remain in the alloy, which interferes with desorption of hydrogen from the alloy. As a result, the alloy is reduced in hydrogen absorbing capacity. Therefore, it is suitable that $0.2 \leq a \leq 0.5$.

Cr facilitates activation of an alloy containing Cr and imparts corrosion resistance against an alkaline electrolyte to the alloy. In order to have this effect, an atomic ratio for Cr, hereinafter "b", should be 0.1 or more. However, Cr disadvantageously elevates the hydrogen equilibrium pressure of an alloy containing Cr and forms a $TiCr_2$ phase. Therefore, a large content of Cr reduces the hydrogen absorbing capacity of the alloy. In order to suppress such adverse effect, $b \leq 0.4$ is mandatory.

Addition of a small amount of Y or rare earth elements such as La, Ce, etc. to an alloy produces a further increased hydrogen absorbing capacity of the alloy. The estimated reason for this effect is that those elements function as deoxidizers to remove oxygen as an impurity in the alloy. Deposition of these elements as the second phase to minimize their migration into the mother phase of the alloy enables to increase only the hydrogen absorbing capacity of the alloy with almost no effect on the composition of the mother phase and no change in the hydrogen equilibrium pressure of the alloy.

The increasing effect of these elements on the hydrogen absorbing capacity remains unchanged even if their contents are increased to an amount exceeding 3 atom % per the whole mother alloy.

In addition to the above-exemplified elements, Mn, Fe, Co, Cu, Nb, Zn, Zr, Mo, Ag, Hf, Ta, W, Al, Si, C, N, P or B may be added if occasion demands. Any of those elements changes the lattice size of an alloy containing these elements by their atomic radius so as to control the hydrogen equilibrium pressure of the alloy, contributing to increasing the volume of hydrogen storage available for electrodes. Furthermore, the presence of Mn, Nb, Mo, Ta or Al contributes to increasing the hydrogen storage capacity of an alloy and the presence of Fe, Co, Cu, Zn, Zr, Ag, Hf, W, Si, N, P or B to enhancing the electrode activity of an alloy. By these effects, the discharge capacity and cycle life of an alloy can be improved. The ratio of those elements in an alloy, hereinafter referred to as "d", is 0.2 or less in total. A "d" value exceeding this range causes a deposition of a phase other than the phase of the body-centered cubic structure, with a reduction of the hydrogen storage capacity.

V is necessary for stabilizing the presence of the phase of the body-centered cubic structure to increase the hydrogen storage capacity of an alloy containing V. The ratio of this element in an alloy is determined automatically by the ratios of other elements.

(2) Size of Crystallites:

There is a tendency that an alloy having a smaller particle size of crystallites, that is, grain size is lower in degree of pulverization during charging and discharging operations. An alloy with a grain size of 20 μm or less can have an exceptional cycle life characteristic.

To produce an alloy with a grain size of 20 μm or less, a quenching method is normally adopted. Quenching may be performed by using various quench methods including atomizing method where a high pressure gas is sprayed on a molten alloy, rotating electrode method where a molten alloy is poured on a rotating drum or a rotating disk, quench rolling method, etc.

(3) Formation of Ni-diffused Layer:

In order to impart an electrochemical catalytic action to an alloy before its use in an electrode, it is effective to adhere nickel on the surface of each of the particles of a hydrogen storage alloy. However, simple adhesion of nickel to those particles will result in reduced capacity of the resultant alloy and lowered rate of hydrogen diffusion. Therefore, the present invention adopts diffusion of nickel on the surfaces of the hydrogen storage alloy particles to form an Ni-diffused layer thereon. The Ni-diffused layer thus formed imparts an exceptional capability to absorb hydrogen to the surfaces of the particles.

This Ni-diffused layer can produce an excellent electrode if only it has a structure where elements such as V, Cr and the like, other than Ni, are incorporated into its body-centered cubic structure analogous to the TiNi phase. This is because this structure balances the activity as an electrochemical catalyst, corrosion resistance and hydrogen storage capacity of the layer.

Methods for forming the Ni-diffused layer include a process of forming a nickel coating film on the surfaces of alloy particles by plating or a process of mixing nickel powder with alloy particles so as to bond the nickel to the alloy particles, and subsequently heating the whole. Another method is physical diffusion of nickel by mechanical alloying or mechanical grinding where a mixture of alloy particles and nickel powders is agitated with a planetary-type ball mill. If heat treatment is performed, heating at a temperature of 500 to 1000° C. in an inert-gaseous atmosphere or under reduced pressure can give an alloy particle with a surface of a desired structure insofar as the alloy composition adopted in the present invention is concerned. Diffusion of nickel does not proceed effectively at a heating temperature lower than 500° C., and deep diffusion of nickel will result at a temperature higher than 1000° C., which adversely reduces the capacity of hydrogen absorption of the surface. At the same time, such an alloy has a phase of a $Ti_2Ni$ structure on its surface, which impairs the characteristics of an electrode formed with this alloy.

It is desired that an alloy undergoing a process of Ni diffusion has a particle size of 40 $\mu$m or less. If an alloy has a particle size larger than 40 $\mu$m, the alloy is pulverized upon absorption or desorption of hydrogen by the alloy, which in turn reduces a ratio of the surfaces having the Ni-diffused layer to the whole surface area and impairs the characteristics of the alloy as an electrode.

In the following, the present invention will be described more specifically referring to the specific examples.

(i) Production of Hydrogen Storage Alloys:

Alloys used in the examples were produced by the arc melting, argon gas-atomizing, roll quenching or rotating electrode method, using commercially available raw materials. The alloys obtained were pulverized by hydrogenation where the alloys were pressure-reduced for 1 hour at room temperature using a rotary pump and subsequently forced to absorb hydrogen by applying hydrogen at 50 atmospheric pressure; then the alloys were pressure-reduced again for 5 hours to desorb therefrom hydrogen having been absorbed therein. Thereafter, the alloys were subjected to mechanical pulverization and particles having a desired size were isolated. Unless otherwise specified, the particle size referred in the examples is 40 $\mu$m or less.

The characteristics of hydrogen gas absorption, more specifically P-C-T (P, hydrogen pressure; C, composition; T, temperature) were determined by measuring hydrogen absorption-desorption capacity in a hydrogen-gaseous atmosphere, using a Sievert's apparatus. Alloy samples were activated by causing them to absorb therein and desorb therefrom hydrogen under the same condition applied in the pulverizing process by hydrogenation. Then, after the samples were degassed at 200° C. for 5 hours, their hydrogen absorption-desorption capacity at 70° C. was measured.

Ni-diffused layer was formed on the surfaces of alloy particles by using one of the methods described below.

One method is to add 10 wt % nickel powder having a mean particle size of 0.03 $\mu$m to alloy particles and mix them in a mortar, followed by mechanically alloying the mixture using a ball mill or heat-treating the mixture. The other is to treat the alloy particles with 2% hydrofluoric acid to purify the particle surfaces, and then immerse those alloy particles in a commercially available electroless nickel plating bath to adhere 10 wt % nickel to the alloy particles by agitation for 30 min at 50° C., followed by heat treatment.

(ii) Production and Evaluation of the Characteristics of Hydrogen Storage Alloy Negative Electrode:

First, a copper powder (0.4 g) was mixed with an alloy powder (0.1 g) and the mixture was pressure-molded to a pellet which served as an electrode. To this electrode, nickel mesh was pressure-bonded and a nickel ribbon was further welded thereto so as to form a lead for the electrode. The negative electrode thus obtained was combined with a nickel hydroxide electrode with an excess electric capacity as a counter electrode and a large amount of an electrolyte comprising an aqueous potassium hydroxide solution having a specific gravity of 1.30 so as to form a flooded-type battery with a regulated capacity by the hydrogen storage alloy negative electrode.

The battery thus produced was subjected to repeated charge and discharge cycles where charging was performed for 8 hours at the 1st cycle and 5.5 hours at the second and the subsequent cycles under a condition of a current of 100 mA per 1 g of the hydrogen storage alloy and discharging at a current of 50 mA per 1 g of the alloy until the terminal voltage dropped to 0.8 V. After the test, the discharge capacity of the battery was measured.

Deterioration in capacity was calculated using the following equation:

Capacity deterioration (%)=100×(reduced discharge capacity after 50 cycles)/(maximal discharge capacity).

EXAMPLE 1

In the present example, alloy compositions were investigated.

Alloys having one of the compositions listed in Tables 1 and 2 were produced by the arc melting method. After plating nickel on the particles of those alloys, the alloys were heated for 3 hours at a temperature of 600° C. in an inert-gaseous atmosphere. Then, P-C-T measurement was performed for the resultant hydrogen storage alloys.

Tables 1 and 2 show maximal hydrogen storage capacities (hydrogen atom number/metal atom: H/M) of the alloys, maximal discharge capacities of the electrodes prepared with those alloys, and deteriorations in capacity after 50 charge/discharge cycles, together with those of comparative examples. Sample Nos. 1-1 to 1-27 are alloys Example 1 of the present invention and Nos. 1-28 to 1-33 are those of comparative examples. Incidentally, the alloy component "L" represents La unless otherwise stated.

TABLE 1

| No. | Ti | V | Cr | L (La) | M | Hydrogen storage capacity H/M | Discharge capacity mAh/g | Capacity deterioration %/50 cycles |
| --- | --- | --- | --- | --- | --- | --- | --- | --- |
| 1-1 | 0.5 | 0.38 | 0.1 | 0.02 | | 1.72 | 492 | 15 |
| 1-2 | 0.5 | 0.18 | 0.4 | 0.02 | | 1.70 | 481 | 7 |
| 1-3 | 0.3 | 0.58 | 0.1 | 0.02 | | 1.80 | 506 | 15 |
| 1-4 | 0.3 | 0.28 | 0.4 | 0.02 | | 1.71 | 482 | 8 |
| 1-5 | 0.2 | 0.48 | 0.1 | 0.02 | | 1.81 | 513 | 15 |

TABLE 1-continued

| No. | Ti | V | Cr | L (La) | M | Hydrogen storage capacity H/M | Discharge capacity mAh/g | Capacity deterioration %/50 cycles |
|---|---|---|---|---|---|---|---|---|
| 1-6 | 0.2 | 0.48 | 0.4 | 0.02 | | 1.70 | 483 | 8 |
| 1-7 | 0.3 | 0.53 | 0.15 | 0.02 | | 1.81 | 522 | 12 |
| 1-8 | 0.3 | 0.43 | 0.15 | 0.02 | Mn 0.1 | 1.83 | 525 | 14 |
| 1-9 | 0.3 | 0.43 | 0.15 | 0.02 | Nb 0.1 | 1.84 | 528 | 14 |
| 1-10 | 0.3 | 0.43 | 0.15 | 0.02 | Co 0.1 | 1.78 | 507 | 8 |
| 1-11 | 0.3 | 0.43 | 0.15 | 0.02 | Cu 0.1 | 1.76 | 503 | 9 |
| 1-12 | 0.3 | 0.43 | 0.15 | 0.02 | Fe 0.1 | 1.78 | 502 | 9 |
| 1-13 | 0.3 | 0.43 | 0.15 | 0.02 | Zn 0.1 | 1.78 | 523 | 13 |
| 1-14 | 0.3 | 0.43 | 0.15 | 0.02 | Zr 0.1 | 1.77 | 516 | 8 |
| 1-15 | 0.3 | 0.43 | 0.15 | 0.02 | Mo 0.1 | 1.82 | 528 | 11 |
| 1-16 | 0.3 | 0.43 | 0.15 | 0.02 | Ag 0.1 | 1.72 | 521 | 11 |

TABLE 2

| No. | Ti | V | Cr | L (La) | M | Hydrogen storage capacity H/M | Discharge capacity mAh/g | Capacity deterioration %/50 cycles |
|---|---|---|---|---|---|---|---|---|
| 1-17 | 0.3 | 0.43 | 0.15 | 0.02 | Hf 0.1 | 1.76 | 512 | 8 |
| 1-18 | 0.3 | 0.43 | 0.15 | 0.02 | Ta 0.1 | 1.84 | 526 | 14 |
| 1-19 | 0.3 | 0.43 | 0.15 | 0.02 | W 0.1 | 1.78 | 513 | 13 |
| 1-20 | 0.3 | 0.43 | 0.15 | 0.02 | Al 0.1 | 1.82 | 529 | 12 |
| 1-21 | 0.3 | 0.43 | 0.15 | 0.02 | Si 0.1 | 1.76 | 525 | 11 |
| 1-22 | 0.3 | 0.43 | 0.15 | 0.02 | N 0.1 | 1.76 | 523 | 12 |
| 1-23 | 0.3 | 0.43 | 0.15 | 0.02 | P 0.1 | 1.75 | 525 | 11 |
| 1-24 | 0.3 | 0.43 | 0.15 | 0.02 | B 0.1 | 1.74 | 526 | 10 |
| 1-25 | 0.3 | 0.53 | 0.15 | Ce 0.02 | | 1.82 | 519 | 11 |
| 1-26 | 0.3 | 0.53 | 0.15 | Mm 0.02 | | 1.79 | 516 | 11 |
| 1-27 | 0.3 | 0.53. | 0.15 | Y 0.02 | | 1.80 | 521 | 12 |
| 1-28 | 0.1 | 0.58 | 0.3 | 0.02 | | 1.58 | 472 | 19 |
| 1-29 | 0.48 | 0 | 0.5 | 0.02 | | 1.33 | 380 | 6 |
| 1-30 | 0.6 | 0.20 | 0.1 | 0.02 | | 1.73 | 338 | 25 |
| 1-31 | 0.4 | 0.58 | 0 | 0.02 | | 1.78 | 503 | 42 |
| 1-32 | 0.3 | 0.55 | 0.15 | | | 1.68 | 482 | 22 |
| 1-33 | 0.3 | 0.5 | 0.15 | 0.05 | | 1.66 | 463 | 13 |

As apparent from Tables 1 and 2, alloys of the comparative examples have a low capacity and are drastically reduced in capacity with the progress of charge/discharge cycles. To the contrary, all the alloys in accordance with the present invention have a high hydrogen storage capacity of H/M=1.6 or more, and exhibit a high discharge capacity of 450 mAh/g or more when used as electrodes. Moreover, the deterioration in capacity remains within 20%. Thus, the alloys of the present invention demonstrate their exceptionalness in all characteristics.

EXAMPLE 2

In the present example, alloy grain sizes were measured. Alloys having a composition represented by the formula $Ti_{0.3}V_{0.53}Cr_{0.15}La_{0.02}$ were produced using the various methods listed in Table 3. After plating nickel on the particles of those alloys and heating them in the same manner as in Example 1, the alloys were formed into hydrogen storage alloy electrodes. Then, the alloys and the electrodes prepared therefrom were evaluated in the same manner as in Example 1. The results are listed in Table 3. In this example, for grasping whether the grain size differs by the production method, grain size was measured in the alloys produced by the same method before and after heat treatment after their production.

TABLE 3

| No. | Production method of alloy | Grain size ($\mu$m) | Discharge capacity (mAh/g) | Capacity Detriaration (%/50 cycles) |
| --- | --- | --- | --- | --- |
| 2-1 | Gas atomizing method | 8 | 529 | 10 |
| 2-2 | Roll quenching method | 10 | 525 | 9 |
| 2-3 | Rotating electrode method | 7 | 531 | 7 |
| 2-4 | Arc melting method | 18 | 522 | 12 |
| 2-5 | Gas atoming method + heat treatment (1000° C. × 12 h) | 25 | 513 | 16 |
| 2-6 | Arc melting method + heat treatment (1000° C. × 12 h) | 73 | 508 | 23 |

As clearly understood from Table 3, alloys having a grain size of 20 $\mu$m or less, like sample Nos. 2-1 to 2-4, exhibit a deterioration in capacity within 20%, thus giving excellent electrodes. It was found that as observed in sample Nos. 2-5 and 2-6, in the alloys having a grain size of 20 $\mu$m or less which had undergone heat treatment after production, the degree of deterioration in capacity by cycles is enhanced.

EXAMPLE 3

In the present example, the method for forming the Ni-diffused layer was investigated.

Alloys having the composition represented by the formula $Ti_{0.3}V_{0.53}Cr_{0.15}La_{0.02}$ were produced by the gas atomizing method. In the alloys thus obtained, the Ni-diffused layer was formed on the surfaces of the particles using various methods. Then, using the alloy particles having their surfaces disposed with the Ni-diffused layer, various electrodes were produced in the same manner as in Example 1, and the maximal discharge capacity and deterioration in capacity after 50 cycles were measured. The results are shown in Table 4.

TABLE 4

| No. | Ni adhering method | Discharge capacity (mAh/g) | Capacity deterioration (%/50 cycles) |
| --- | --- | --- | --- |
| 3-1 | Electroless Ni plating | 0 | — |
| 3-2 | Electroless Ni plating + heat treatment (400° C. × 6 h) | 128 | 38 |
| 3-3 | Electroless Ni plating + heat treatment (600° C. × 6 h) | 529 | 10 |
| 3-4 | Electroless Ni plating + heat treatment (900° C. × 0.5 h) | 508 | 11 |
| 3-5 | Electroless Ni plating + heat treatment (1100° C. × 0.5 h) | 380 | 8 |
| 3-6 | Mixing with Ni powder | 13 | — |
| 3-7 | Mixing with Ni powder + heat treatment (600° C. × 6 h) | 512 | 13 |
| 3-8 | Mixing with Ni powder (Ball milling for 48 h) | 488 | 12 |

Comparative Example No. 3-1 which incorporates nickel only on its surface can not afford a high discharge capacity. However, once it is heat-treated (sample Nos. 3-3, 3-4) or alloyed by applying a mechanical force (sample No. 3-8), the resultant alloy has a high discharge capacity.

A comparison of sample No. 3-3 having an Ni-diffused layer formed by nickel plating with sample No. 3-7 having an Ni-diffused layer formed with a powder mixture indicates that the former has better characteristics than the latter. This may be because the plating process produces a more tight and thorough nickel coating on the alloy surface.

Comparative Example No. 3-2, which was heated at low temperature after being plated with nickel, has an extremely low discharge capacity of 128 mAh/g. To the contrary, sample Nos. 3-3 and 3-4, which were heated at a temperature of 500 to 1000° C., show a high capacity higher than 500 mAh/g. Comparative Example No. 3-5, which was heated at a temperature higher than 1000° C., was found to have a reduced capacity. The causes of these findings may be that diffusion of nickel does not proceed sufficiently by heating at a temperature lower than 500° C., reducing the discharge capacity of the resultant alloy, whereas, nickel diffusion is accelerated in excess by heating at a temperature higher than 1000° C., even if the treatment time is shortened, as a result of which the Ni-diffused layer has the same crystal structure as that of the $Ti_2Ni$ phase.

On the other hand, the Ni-diffused layer formed by mechanical alloying (sample No. 3-8) which does not require heat treatment can give an alloy with a high discharge capacity.

EXAMPLE 4

In the present example, alloy particle size was investigated.

Alloys having the composition represented by the formula $Ti_{0.3}V_{0.53}Cr_{0.15}La_{0.02}$ were produced using the roll quenching method. Subsequently, the alloys were pulverized mechanically and filtered using different mesh sizes (75, 40 and 15 $\mu$m). The respective alloy particles were disposed with nickel on the surfaces thereof by electroless plating and heated for 6 hours at a temperature of 600° C. in an inert gas to form an Ni-diffused layer on the surface of the alloy. Using the alloy particles thus produced, electrodes of this example were produced and their characteristics were evaluated in the same manner as in Example 1. Table 5 shows maximal discharge capacities and deteriorations in capacity after 50 charge/discharge cycles in those electrodes. Table 5 also lists mesh sizes used for filtering those particles before they were plated with nickel.

TABLE 5

| No. | Particle size | Discharge capacity (mAh/g) | Capacity deterioration (%/50 cycles) |
| --- | --- | --- | --- |
| 4-1 | 40 $\mu$m or less | 525 | 9 |
| 4-2 | 75 $\mu$m or less | 452 | 17 |
| 4-3 | 15 $\mu$m or less | 531 | 13 |

The results show that Comparative Example No. 4-2 using the alloy with a particle size exceeding 40 $\mu$m is slightly poor both in discharge capacity and cycle life characteristic, but sample Nos. 4-1 and 4-3 using alloys having a particle size less than 40 $\mu$m have exceptional characteristics. The reason may be that since the alloy with a particle size exceeding 40 $\mu$m is easily pulverized during charging and discharging process, such an area not covered with the Ni-diffused layer may appear on the surface of the alloy. Furthermore, the area covered with the Ni-diffused layer is not so large in this alloy. These factors are considered to cause a deterioration of the electrode characteristics.

On the other hand, alloys having particle sizes of 40 μm or less have almost identical characteristics. However, alloys with a particle size less than 15 μm are high in discharge capacity but disadvantageously large in deterioration of capacity by cycles. This may be because those alloys have a thin Ni-diffused layer due to their large specific surface area, and thus suffer from poor corrosion resistance.

EXAMPLE 5

In Example 5, alloys were prepared by adding La, Ce or Mm (misch metal) in a concentration of 2 atom % to the alloy "a" having a composition represented by the formula $Ti_{0.4}V_{0.45}Cr_{0.15}$ as examples of the alloys of the body-centered cubic structure, and named "b", "c" and "d", respectively in this order. Then, their characteristics were analyzed. Separately, another alloy named "e" was produced as a comparative example, by melting the above-mentioned alloy "a" with an addition of 5 wt % nickel, and the characteristics of this alloy were examined.

Those alloys were produced by arc melting, using commercially available Ti, V, Cr, La, Ce, Mm and Ni as the starting materials. In the alloy samples thus prepared, P-C-T were measured. The results are shown in FIG. 1. A comparison of the hydrogen absorption curve at 70° C. revealed that addition of a rare earth element(s) produces a maximal increase of H/M=0.15 or so in the hydrogen storage capacity. In addition, similar measurements for the comparative example "e" with an addition of 5 wt % nickel showed that the alloy had the smallest hydrogen storage capacity. The degree of reduction was larger than the degree of reduction caused by Ni addition (5 wt %).

Then, the cross-section of each alloy was observed using an electron probe microanalyzer (EPMA). And, the presence of the main phase composed of Ti, V and Cr and an insular distribution of the second phase composed mainly of a rare earth element(s) were confirmed. Compositional assay in the alloy with an addition of La failed to detect La in the main phase with a composition of $Ti_{0.38}V_{0.48}Cr_{0.14}$ close to the original composition. However, although not accurate due to extremely small size, the second phase was found to have a composition represented by the formula $Ti_{0.21}V_{0.12}Cr_{0.02}La_{0.65}$, which shows the presence of much La. Compositional analysis in the other alloys indicated an effect of cooling rate during alloy production on the composition, but showed that the contents of the rare earth element(s) contained in the second phase were all 40 atom % or more, suggesting the increasing effect of the second phase on the capacity.

The alloys as exemplified above were subjected to the following half-cell tests in order to evaluate their characteristics when used as negative electrodes for alkaline storage batteries by electrochemical charge/discharge reactions.

To an alloy powder pulverized into 38 μm or less, 5 wt % nickel powder with a particle size of 1 μm was added, and the mixture was heated for 2 hours at 800° C. so as to form an Ni-diffused layer on the surface of the alloy. The resultant alloy powder (1 g) was further added with nickel powders (3 g) as a conductive agent and a polyethylene powder (0.12 g) as a binder, then the mixture was pressure-molded to a pellet and heated to melt the binder at 130° C., which gave an electrode. The alloy negative electrode thus obtained was combined with a positive electrode of nickel hydroxide having an excess electric capacity and an electrolyte of an aqueous potassium hydroxide solution having a specific gravity of 1.30 to assemble a flooded-type battery similar to that used in Example 1. The battery thus produced underwent repeated charge and discharge cycles where charging was performed for 7 hours at a current of 100 mA per 1 g of the hydrogen storage alloy and discharging at a current of 50 mA per 1 g of the alloy until the terminal voltage dropped to 0.8 V.

Figure 2:
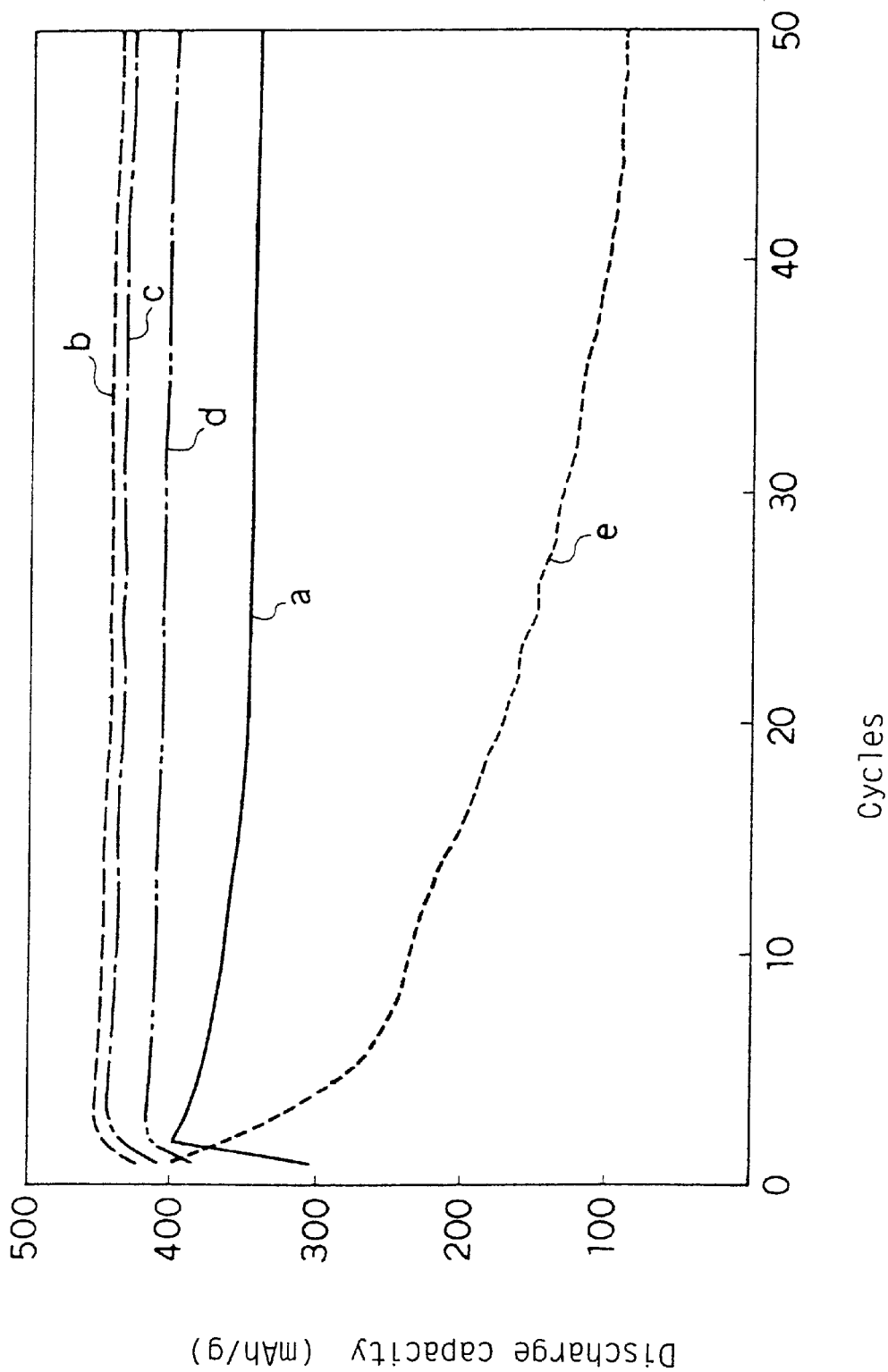
FIG. 2 shows a comparison of the cycle life characteristic between those electrodes.

Comparative results of discharge capacity between the electrodes prepared with various alloys with an addition of different rare earth element(s) are illustrated in FIG. 2. Electrodes prepared from the alloys with an addition of a rare earth element(s) have a high capacity compared to those with no addition. La produced almost no difference from Ce. Mm produced a slight reduction in capacity, which was considered due to the effect of those elements other than La and Ce. Furthermore, the alloy containing a mixture of La and Ce was confirmed to have no different effect from that of the alloys with La or Ce. The electrodes prepared with the alloys containing La or Ce, or both and having their surface disposed with the Ni-diffused layer were found to have a high capacity and less in degree of deterioration by charge/discharge cycles, compared to those prepared from an alloy bulk containing Ni.

As discussed above, the present invention can provide a hydrogen storage alloy electrode with a high discharge capacity and an exceptional cycle life characteristic.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

We claim:

1. A hydrogen storage alloy electrode comprising particles of a hydrogen storage alloy represented by the general formula

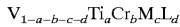

$$V_{1-a-b-c-d}Ti_aCr_bM_cL_d$$

wherein M is at least one element selected from the group consisting of Mn, Fe, Co, Cu, Nb, Zn, Zr, Mo, Ag, Hf, Ta, W, Al, Si, C, N, P and B, and L is at least one element selected from the group consisting of Y and rare earth elements, wherein $0.2 \leq a \leq 0.5$, $0.1 \leq b \leq 0.4$, $0 \leq c \leq 0.2$, and $0 \leq d \leq 0.03$, said hydrogen storage alloy having a body-centered cubic structure, and wherein said particles are nickel-free.

2. The hydrogen storage alloy electrode in accordance with claim 1, wherein said hydrogen storage alloy has a mean grain size of 20 μm or less.

3. The hydrogen storage alloy electrode in accordance with claim 1, wherein said hydrogen storage alloy has a mean particle size of 40 μm or less.

4. The hydrogen storage alloy electrode in accordance with claim 1, wherein said particles of the hydrogen storage alloy have an Ni-diffused layer on the surface thereof.

5. The hydrogen storage alloy electrode in accordance with claim 4, wherein said Ni-diffused layer has the body-centered cubic structure.

6. The hydrogen storage alloy electrode in accordance with claim 5, wherein said Ni-diffused layer has been formed by the steps of providing each of said alloy particles with Ni plating or Ni powder coating and subsequently heating said particles at a temperature in a range of 500 to 1000° C. in an inert-gaseous atmosphere or under reduced pressure.

7. The hydrogen storage alloy electrode in accordance with claim 5, wherein said Ni-diffused layer has been formed by a process of mechanical alloying or mechanical grinding.

8. The hydrogen storage alloy electrode in accordance with claim 1, wherein said hydrogen storage alloy has been produced by a quench method.

9. The hydrogen storage alloy electrode in accordance with claim 8, wherein said quench method has been performed using an atomizing method, a rotating electrode method, or a quench rolling method.

10. A hydrogen storage alloy electrode comprising particles of a hydrogen storage alloy represented by the general formula $$V_{1-x-y-z}Ti_xM'_yLn_z$$

wherein Ln is at least one element selected from La and Ce or a mixture of rare earth elements including at least one element selected from La and Ce, M' represents at least one element selected from the group consisting of Cr, Mn, Fe, Co, Nb, Mo, Cu and Zr, wherein $0.2 \leq x \leq 0.4$, $0.005 \leq z \leq 0.03$ and $0.4 \leq x+y+z \leq 0.7$, said alloy having a body-centered cubic structure, and wherein said particles are nickel-free.

11. The hydrogen storage alloy electrode in accordance with claim 10, wherein $0.1 \leq y \leq 0.4$.

12. The hydrogen storage alloy electrode in accordance with claim 10, wherein said hydrogen storage alloy is dispersed therein with a plurality of second phase containing Ln in a concentration of 40 atom % or more.

13. The hydrogen storage alloy electrode in accordance with claim 10, wherein said particles of the hydrogen storage alloy have an Ni-diffused layer on the surface thereof.

14. A hydrogen storage alloy electrode comprising particles of a hydrogen storage alloy represented by the general formula $$V_{1-x-y-z}Ti_xCr_wM''_vLn_z$$

wherein Ln is at least one element selected from La and Ce or a mixture of rare earth elements including at least one element selected from La and Ce, M" represents at least one element selected from the group consisting of Mn, Fe, Co, Nb, Mo, Cu and Zr, wherein $0.2 \leq x \leq 0.4$, $0.1 \leq y \leq 0.4$, $0.005 \leq z \leq 0.03$, $0.4 \leq x+y+z \leq 0.7$, $0.1 \leq w \leq 0.4$ and w+v=y, said alloy having a body-centered cubic structure, and wherein said particles are nickel-free.

15. The hydrogen storage alloy electrode in accordance with claim 14, wherein said hydrogen storage alloy is dispersed therein with a plurality of second phase containing Ln in a concentration of 40 atom % or more.

16. The hydrogen storage alloy electrode in accordance with claim 14, wherein said particles of the hydrogen storage alloy have an Ni-diffused layer on the surface thereof.

17. A hydrogen storage alloy electrode comprising particles of a hydrogen storage alloy represented by the general formula $$V_{1-a-b-c-d}Ti_aCr_bM_cL_d$$

wherein M is at least one element selected from the group consisting of Mn, Fe, Co, Cu, Nb, Zn, Zr, Mo, Ag, Hf, Ta, W, Al, Si, C, N, P and B, and L is at least one element selected from the group consisting of Y and rare earth elements, wherein $0.2 \leq a \leq 0.5$, $0.1 \leq b \leq 0.4$, $0 \leq c \leq 0.2$, and $0 \leq d \leq 0.03$, wherein said hydrogen storage alloy has a body-centered cubic structure, wherein said particles contain no nickel, and wherein said particles of the hydrogen storage alloy have a Ni-diffused layer on the surface thereof.

18. A hydrogen storage alloy electrode comprising particles of a hydrogen storage alloy represented by the general formula $$V_{1-a-b-c-d}Ti_aCr_bM_cL_d$$

wherein M is at least one element selected from the group consisting of Mn, Fe, Co, Cu, Nb, Zn, Zr, Mo, Ag, Hf, Ta, W, Al, Si, C, N, P and B, and L is at least one element selected from the group consisting of Y and rare earth elements, wherein $0.2 \leq a \leq 0.5$, $0.1 \leq b \leq 0.4$, $0 \leq c \leq 0.2$, and $0 \leq d \leq 0.03$, wherein said hydrogen storage alloy has a body-centered cubic structure, wherein said particles contain no nickel, wherein said particles of the hydrogen storage alloy have a Ni-diffused layer on the surface thereof, and wherein said Ni-difflused layer has a body-centered cubic structure.

* * * * *